UNITED STATES PATENT OFFICE.

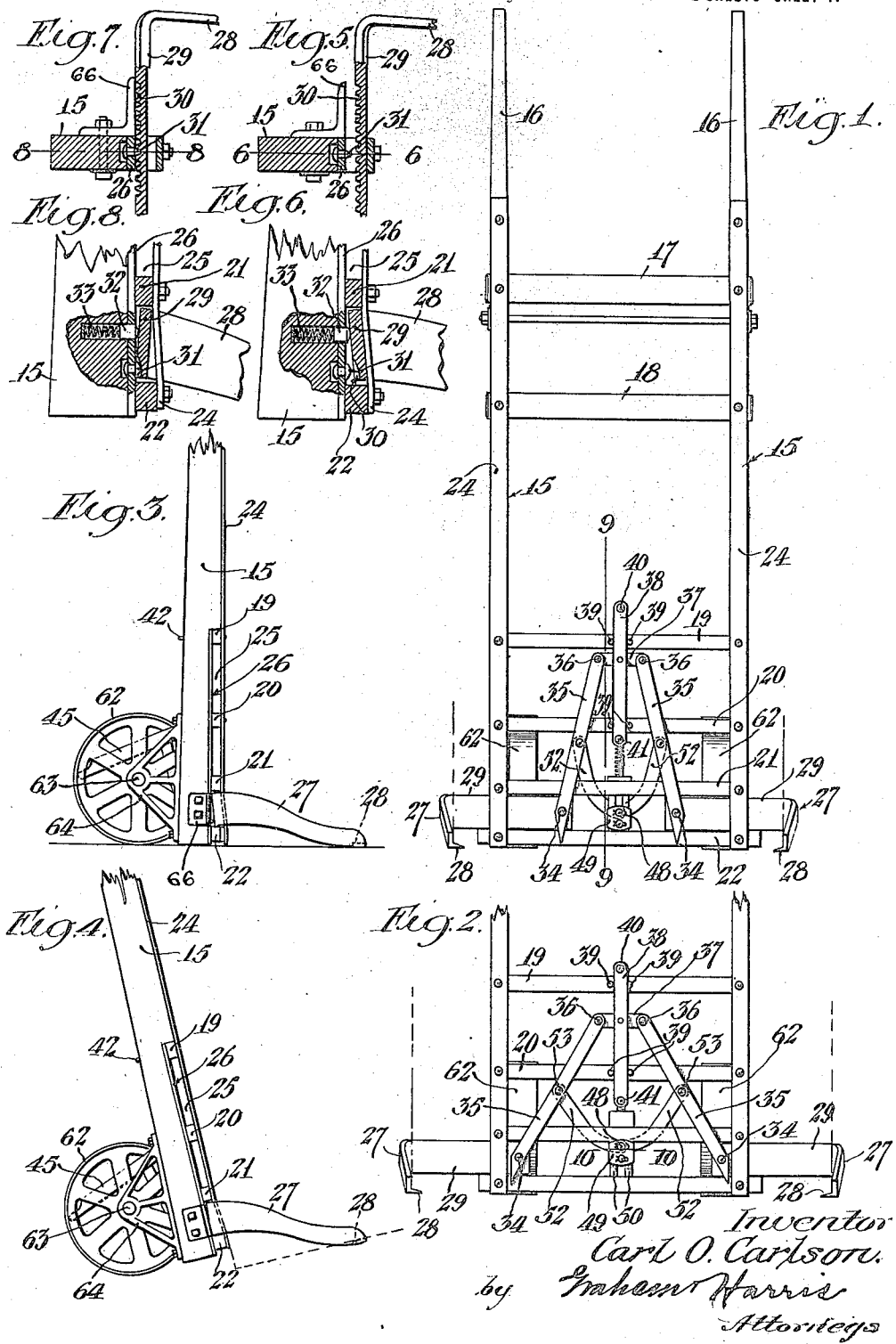
C. O. CARLSON.
HAND TRUCK.
APPLICATION FILED JUNE 2, 1920.
1,422,254.
Patented July 11, 1922.
2 SHEETS—SHEET 1.

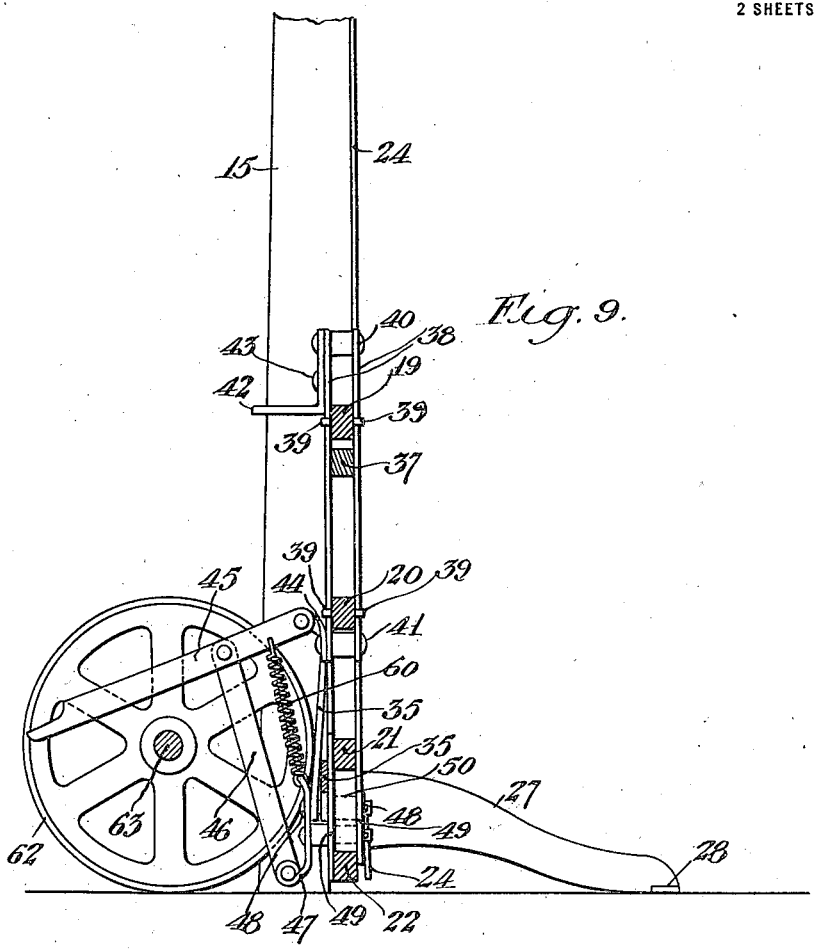
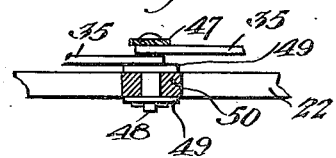
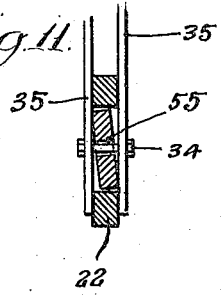
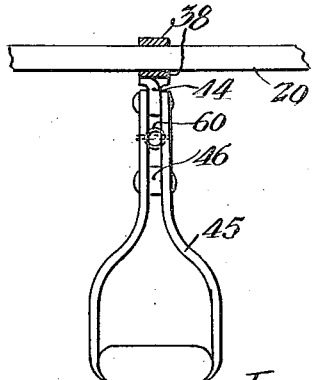
Inventor
Carl O. Carlson

CARL O. CARLSON, OF RIVERSIDE, CALIFORNIA.

HAND TRUCK.

1,422,254.  Specification of Letters Patent.  Patented July 11, 1922.

Application filed June 2, 1920. Serial No. 386,053.

*To all whom it may concern:*

Be it known that I, CARL O. CARLSON, a citizen of the United States, residing at Riverside, in the county of Riverside and State of California, have invented a new and useful Hand Truck, of which the following is a specification.

My invention relates to trucks for transporting boxes and other articles of merchandise, being more particularly a hand truck designed to carry stacks of boxes.

The principal object of my invention is to produce a truck of the class described, of simple form and construction, which may be easily operated and in which the jaws are automatically locked in place when carrying the load.

Other objects and advantages will appear hereinafter from the following specification.

Referring to the drawings, which are for illustrative purposes only,

Fig. 1 is a face view of a truck embodying a form of my invention, the jaws being shown in engagement position.

Fig. 2 is a view similar to Fig. 1, the lower part of the truck being shown with the jaws in open position.

Fig. 3 is a side view of the lower portion of the truck shown in Fig. 1.

Fig. 4 is a view similar to Fig. 3 showing the truck in tilted position.

Fig. 5 is a sectional plan view of a portion of one of the jaws and mounting of the same.

Fig. 6 is a vertical sectional view on line 6—6, Fig. 5.

Fig. 7 is a view similar to Fig. 5 showing the jaw in locked position.

Fig. 8 is a vertical sectional view on line 8—8, Fig. 7.

Fig. 9 is an enlarged vertical sectional view on line 9—9, Fig. 1.

Fig. 10 is a sectional plan view on line 10—10, Fig. 2.

Fig. 11 is a vertical sectional view on line 11—11, Fig. 1; and,

Fig. 12 is a sectional plan view of the stirrup.

The truck consists of a frame having two vertical standards or side rails 15 which terminate at their upper ends in handles 16. The side rails are connected by cross-rails 17, 18, 19, 20 and 21, and a bottom rail 22. The front face of each side rail 15 is covered by a metal strap 24 and the lower ends of the side rails are recessed as indicated at 25, the faces of such recess being covered by a metal strap 26.

27, 27 designate two jaws terminating at their forward end in spurs 28, the rear end of the jaws being bent inwardly at right angles forming shanks 29 which extend into the recesses 25 between the rails 21 and 22. The rear face of each shank 29 is provided with a series of teeth forming a rack 30 arranged to be engaged by a tooth 31 which is secured to the strap 26. The shank 29 of each jaw is considerably narrower than the recess 25 which permits a rocking movement of the shank into the extreme positions shown in Figs. 5 to 8, inclusive, a push button 32 being mounted in the strap 26 which is acted upon by a coiled spring 33 to cause the button 32 to elastically hold the jaw in the position shown in Figs. 5 and 6, that is, with the tooth 31 out of engagement with the rack on the shank. The inner ends of the shanks 29 are pivotally connected by means of pins or bolts 34 with levers 35, the upper ends of the levers 35 being pivotally mounted by means of pins or bolts 36 to a bar 37. The bar 36 is secured in any suitable manner to operating slide bars 38 which span the cross-bars of the truck frame. The operating bars 38 are kept in proper position during their vertical sliding movement by means of pins 39 mounted on the cross-rails 19 and 20. The operating bars 38 are joined at the top by means of a bolt 40 and at the bottom by a bolt 41 so that such bars act in unison as a unitary structure forming an operating member.

The upper end of the operating member is provided with a foot piece 42 secured thereto by means of a suitable rivet 43 and the bolt 40. Secured to the lower end of the slide bars 38 by means of the bolt or rivet 41 is a bracket 44 to which is pivotally mounted the inner end of a stirrup 45, such stirrup 45 being pivotally connected by means of a link 46 to a bracket 47 which bracket is connected by means of rivets 48 with a slidable block 49, such block being slidably mounted upon posts 50 which extend between the cross-rails 21 and 22.

52 designates two links, the lower end of each link being pivotally mounted on the upper rivet 48 of the block 49, and the upper ends of the links 52 being pivotally connected by means of pins or bolts 53 with the levers 35 intermediate their length. The connection between the lower end of the levers 35 and the shanks of the jaws is such that the jaws may be rocked. This is accomplished by making the bolt receiving opening 55 in the shanks of the jaws of larger diameter than the bolt 34. 60 designates a coiled spring attached at its upper end to the stirrup 45 and at its lower end to the bracket 47 so as to elastically pull the slide bars 38 downwardly. The truck is supported on two wheels 62 each mounted on a stub shaft 63 mounted in brackets 64 secured to the side rails 15 of the frame.

The truck is operated in the following manner:

By putting the foot upon the foot piece 42 the operating bars 38 are moved downwardly, which through the medium of the levers 35 cause the jaws to be moved outwardly, such movement being governed by the links 52. The truck is then put in the position shown in Fig. 3 and the stirrup pressed downwardly with the foot which brings the jaws together against the ends of the boxes indicated in dotted lines in Fig. 1, as the stirrup, having its pivotal point on the upper end of the link 46 and being connected at its inner end to the slide bars 38, causes the operating bars to move upwardly. During this movement the jaws are in the position shown in Figs. 5 and 6, that is, the tooth 31 is out of engagement with the rack 30. When the spurs 28 are under the box to be moved the truck is tilted into the position shown in Fig. 4 and as the weight of the boxes is on the outer ends of the jaws the jaws are caused to tilt into the position shown in Figs. 7 and 8 in which position the tooth 31 comes into engagement with the rack on the shank of the jaws and prevents the jaws from spreading until the truck is again put into the position shown in Fig. 3, which tilts the jaws so that the racks thereon are out of engagement with the tooth 31. The jaws are then spread apart by pressure of the foot piece 42 as heretofore referred to.

When the truck is used for carrying a load of considerable width it is desirable to support the jaws against backward movement, and to attain this object I place an angle iron 66 on each side rail 24, one wing of each iron 66 being secured to the rail and the other wing of each iron extending behind the shank of the jaw.

While I have shown and described the shank of the jaws provided with a rack and a tooth mounted on the frame for engaging said rack for the purpose of automatically locking the jaws when a load is placed thereon, it is to be understood that I do not limit my invention to that precise construction shown but desire it to be understood that any construction in which the jaws are rocked, that is, turned in their support, by the weight of the load to lock the jaws is embraced in my invention.

I claim as my invention:—

1. A hand truck comprising a frame, supporting wheels for the frame, locking means in the frame, and a pair of movable jaws mounted in the frame arranged to be moved by the weight of the load into engagement with said locking means.

2. A hand truck comprising a frame, supporting wheels for the frame, a pair of movable jaws mounted in the frame, teeth mounted on said frame, and means on said jaws arranged to engage said teeth when said jaws are moved by the weight of the load.

3. A hand truck comprising a frame, supporting wheels for the frame, a pair of jaws slidably and rockingly mounted in the frame, locking means on the frame, and means on the jaws arranged to engage said locking means by rocking movement of the jaws.

4. A hand truck comprising a frame, supporting wheels for the frame, locking means in the frame, a pair of movable jaws mounted in the frame arranged to be moved by the weight of the load into engagement with said locking means, and means for elastically holding said jaws out of such locking engagement.

5. A hand truck comprising a frame, supporting wheels for the frame, a pair of jaws slidably mounted in the frame adapted to rock therein, levers connected to said jaws, means for operating said levers to move said jaws laterally, and means operated by the rocking movement of said jaws for locking said jaws against lateral movement.

6. A hand truck comprising a frame, supporting wheels for the frame, a pair of jaws slidably mounted in the frame adapted to rock therein, levers connected to said jaws, a pair of links pivotally connected to said levers at one end and to said frame at the other end, an operating member for said levers, and means operated by the rocking movement of said jaws for locking said jaws against lateral movement.

7. A hand truck comprising a frame, supporting wheels for said frame, a pair of jaws slidably mounted on said frame, levers connected to said jaws, a block slidably mounted on said frame, links connecting said levers and said block, an operating member connected to said levers, a stirrup pivotally connected to said operating member, and a link connecting said stirrup with said block.

8. A hand truck comprising a frame consisting of side rails and cross rails connecting said side rails, a pair of jaws, shanks on said jaws slidably mounted between two of said cross rails, means for operating said jaws laterally, and means operated by the weight of the load for automatically locking said jaws against lateral movement.

9. In a hand truck, a frame, supporting wheels for the frame; said frame having a side rail at each side thereof and a pair of cross rails at the lower end of the side rails forming a recess; a pair of jaws, a shank on each jaw slidably extending into said recess, locking means on said frame and means on each jaw coacting with said locking means.

In testimony whereof, I have hereunto set my hand at Los Angeles, California, this 27th day of May, 1920.

CARL O. CARLSON.